United States Patent [19]

Thoma et al.

[11] 3,984,607

[45] Oct. 5, 1976

[54] POLYURETHANE COATED TEXTILE SHEETS

[75] Inventors: Wilhelm Thoma, Bergisch-Neukirchen; Bernd Quiring, Leverkusen, both of Germany

[73] Assignee: Bayer Aktiengesellschaft, Leverkusen, Germany

[22] Filed: Jan. 20, 1975

[21] Appl. No.: 542,733

[30] Foreign Application Priority Data
Jan. 22, 1974 Germany............................ 2402840

[52] U.S. Cl................................ 428/425; 156/246; 156/247; 427/411; 427/412; 428/424; 428/904
[51] Int. Cl.²...................... B32B 27/40; D06N 3/04
[58] Field of Search .......... 156/247, 242, 246, 344, 156/230; 264/216; 428/424, 904, 425; 427/407, 411, 412

[56] References Cited
UNITED STATES PATENTS

| | | |
|---|---|---|
| 3,549,404 | 12/1970 | Liberti et al......................... 428/424 |
| 3,650,880 | 3/1972 | Tieniber.......................... 156/247 X |
| 3,664,979 | 5/1972 | Tanomura et al. ............. 428/425 X |
| 3,794,548 | 2/1974 | Wirth et al...................... 428/425 X |
| 3,871,938 | 3/1975 | Takahasi et al................. 156/247 X |

*Primary Examiner*—Ralph Husack
*Attorney, Agent, or Firm*—Frederick H. Colen; Lawrence S. Pope; Gene Harsh

[57] ABSTRACT

Polyurethane coated textile sheets are disclosed and a reversal process for their preparation, wherein the textile sheets are coated by means of a top coat solution with a polymer mixture comprising i. 50 to 90% by weight, based on the total polymer, of a substantially linear polyurethane which is substantially free of reactive end groups and which has been prepared by a process which comprises reacting an organic dihyroxyl compound of molecular weight 500 to 4000 and an organic diol of molecular weight 60 to 450 with an aromatic diisocyanate, ii. 0 to 50% by weight of a vinyl copolymer, and iii. 1 to 50% by weight of a diene graft copolymer, said polymer mixture having been applied to a release substrate prior to said coating process.

10 Claims, No Drawings

POLYURETHANE COATED TEXTILE SHEETS

This invention relates to the use of special mixtures of one-component polyurethanes, diene graft copolymers and optionally vinyl copolymers for coating textile sheets.

Coatings obtained from mixtures of segmented, substantially linear polurethanes from higher molecular weight dihydroxyl compounds, aromatic diisocyanates and dialcohols and chain lengthening agents, vinyl copolymers and diene graft copolymers unexpectedly have substantially improved light-fastness and resistance to light.

It has long been known in the art to coat textiles such as woven or knitted fabrics and bonded webs with solutions of polyester urethanes by the direct or reversal process. The articles obtained are used for the manufacture of outer garments, upholstery goods, bags, cases and the like, shoe uppers, groundsheets, marquees and many other products.

In contrast to the two-component polyurethanes which have been known for some time, the so-called one-component polyurethanes are more recent innovations of the art. These products are obtained by reacting polyhydroxyl compounds, in practice mainly dihydroxypolyesters or dihydroxypolyethers mixed with glycols, preferably ethylene glycol or butane-1,4-diol, with aromatic diisocyanates, preferably 4,4'-diphenylmethanediisocyanate. These substantially linear polyurethanes which can be prepared either solvent-free or in solution are soluble only in solvent mixtures which contain dimethylformamide or other highly polar compounds such as dimethylacetamide or N-methylpyrrolidone in proportions of about 20 to 60%, based on the total quantity of solvent. Solutions of one-component polyurethanes have a practically unlimited pot life.

The film forming process is in this case a purely physical process which, in contrast to that of two-component polyurethanes, is not accompanied by any chemical reaction.

Polyurethanes prepared from aromatic diisocyanates generally have little lightfastness and resistance to light. It is also known to add light-protective agents such as UV absorbents and antioxidants to improve the properties of aromatic one or two-component polyurethanes.

For the production of top coats and bonding coats by the reversal process, one-component polyurethanes are used as 20 to 30% solutions which almost always contain dimethylformamide for solubility reasons. In addition, textile substrates can also be laminated with polyurethane elastomers by the melt extrusion process or the elastomers can be applied as aqueous dispersions or dry sintered powders for coating textiles. The most widely used method in the art is that of coating the substrate with solutions.

It is therefore, an object of this invention to provide an improved process for coating textile sheets by the reversal process. A further object of this invention is to provide coated textiles which have improved light-fastness and resistance to light. Another object of this invention is to provide an improved combination of top coats and bonding coats for coating textiles and the resulting products.

The foregoing objects and others are accomplished in accordance with the invention, generally speaking, by providing a process for producing coated textile sheets which comprises A. applying to a release substrate an organic solvent solution top coat of polymers comprising
 i. 50 to 90% by weight, based on the total polymer, of a substantially linear polyurethane which is substantially free of reactive end groups and which has been prepared by a process which comprises reacting an organic dihydroxyl compound of molecular weight 500 to 4000 and an organic diol of molecular weight 62 to 450 with an aromatic diisocyanate,
 ii. 0 to 50% by weight of a vinyl copolymer, and
 iii. 1 to 50% by weight of a diene graft copolymer,
B. evaporating sufficient solvent to leave a substantially dried top coat on said substrate,
C. applying a bonding coat solution to said top coat,
D. applying said textile sheet to be coated to said release substrate whereby said top coat and said bonding coat are therebetween,
E. substantially evaporating the solvent from said bonding coat and
F. separating the resulting coated textile from said release substrate.

Thus, it has now been found that when using special mixtures of one-component polyurethanes, diene graft copolymers and optionally vinyl copolymers for coating textile sheetings, coatings with improved lightfastness and light resistance are surprisingly obtained. The composition of the top coat is more particularly set out below.

This invention relates to a process for coating textile sheetings with polyurethanes by the reversal process in which, in a first stage, a solution of a polyurethane which is substantially free from reactive end groups is applied as top coat to a release substrate and dried, in a second stage a bonding coat solution is applied to the top coat, the textile sheet is then applied to the bonding coat, the solvent in the bonding coat is evaporated off in a second drying operation, and finally the coated textile is removed from the release substrate.

The top coats used are polymer mixtures composed of:
A. 50 to 90% by weight, based on the total polymer of substantially linear polyurethanes of high molecular weight dihydroxyl compounds (molecular weight 500 to 4000), aromatic diisocyanates and diols (molecular weight 62 to 450),
B. 0 to 50% by weight of vinyl copolymers and
C. 1 to 50% by weight of diene graft polymers.

Polyurethanes A can be prepared in known manner both solvent-free or in solution, both by the one shot process and by a prepolymer process.

The most suitable dihydroxypolyesters and/or dihydroxypolyethers are those with molecular weights between 600 and 4,000, particularly between 800 and 2,500.

The dihydroxypolyesters are prepared in known manner from one or more dicarboxylic acids which preferably contain at least 6 carbon atoms and one or more dihydric alcohols.

Instead of the free polycarboxylic acids, the corresponding polycarboxylic acid anhydrides or corresponding polycarboxylic acid esters of lower alcohols or their mixtures may be used for preparing the polyesters. The polycarboxylic acids may be aliphaic, cycloaliphatic, aromatic and/or heterocyclic and may be substituted, e.g. with halogen atoms, and/or unsaturated. The following are mentioned as examples: succinic acid, pimelic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid which may be mixed with monomeric fatty acids, dimethyl-terephthalate or bisglycol terephthalate. Aliphatic dicarboxylic acids are preferred, particularly adipic acid. Suitable dihydric alcohols include e.g. ethylene glycol, propylene-1,2- and -1,3-glycol, butylene-1,4- and -2,3-glycol, hexane-1,6-diol, octane-1,8-diol, neopentylglycol, 1,4-bis-hydroxymethyl cyclohexane, 2-methyl-1,3-propanediol, diethyleneglycol, triethyleneglycol, tetraethyleneglycol, polyethyleneglycols, dipropyleneglycol, polypropyleneglycols, dibutylene glycol and polybutyleneglycols. Polyesters of lactones such as ε-caprolactone or hydroxy carboxylic acids such as ε-hydroxycaproic acid may also be used. particularly Apart from such polyesters, hydroxypolycarbonates are also suitable for preparing the polyurethanes used according to the invention, particularly the hydroxypolycarbonates obtained from hexane-1,6-diol and diarylcarbonates (preferably diphenyl carbonate).

The polyethers with two hydroxyl groups which may be used according to the invention are also known per se and may be prepared e.g. by the polymerization of epoxides such as ethylene oxides, propylene oxide, butylene oxide, tetrahydrofuran, styrene oxide or epichlorohydrin, each with itself, e.g. in the presence of boron trifluoride or by addition of these epoxides, either as mixtures or successively, to starting components which contain reactive hydrogen atoms such as alcohols or amines, e.g. water, ethylene glycol, propylene-1,2- or -1,3-glycol, 4,4'-dihydroxydiphenylpropane, aniline, ethanolamine or ethylenediamine. Dihydroxybutylene glycol polyethers and dihydroxypropyleneglycol polyethers are particularly preferred.

The starting components used according to the invention also include aliphatic, cycloaliphatic, araliphatic, aromatic and heterocyclic polyisocyanates such as those described e.g. by W. Siefken in Justus Liebigs Annalen der Chemie, 562, pages 75 to 136, for example ethylene diisocyanate, tetramethylene-1,4-diisocyanate, hexamethylene-1,6-diisocyanate, dodecane-1,12-diiocyanate, cyclobutane-1,3-diisocyanate, cyclohexane-1,3- and -1,4-diisocyanate and any mixtures of these isomers, 1-methyl-2,6-diisocyanatocyclohexane, 1,-methyl-2,4-diisocyanatocyclohexane, 1-isocyanato-3,3,5-trimethyl-5-isocyanatomethylcyclohexane, hexahydrotolylene-2,4- and -2,6-diisocyanate and any mixtures of these isomers, hexahydrophenylene-1,3- and/or -1,4-diisocyanate, perhydrodiphenylmethane-2,4'- and/or -4,4'-diisocyanate, phenylene-1,3- and -1,4-diisocyanate, tolylene-2,4- and -2,6-diisocyanate and any mixtures of these isomers diphenylmethane-2,4'- and/or 4,4'-diisocyanate, naphthylene-1,5-diisocyanate or 4,4'-diphenyl-dimethylmethanediisocyanate or also mixtures of these compounds. 4,4'-diphenylmethane diisocyanate is particularly suitable.

The low molecular weight diol components which may be used as chain lengthening agents for the preparation of the polyurethanes used according to the invention preferably have molecular weights of 62 to 450. Various types of diol compounds may be used according to the invention, for example, a. alkanediols such as ethyleneglycol, propylene-1-3-glycol and propylene-1,2-glycol, butane-1,4-diol, pentane-1,5-diol, dimethylpropane-1,3-diol and hexane-1,6-diol, b. ether diols such as diethylene glycol, triethylene glycol or 1,4-phenylene-bis-(β-hydroxyethylether);

c. aminodiols such as N-methyl-diethanolamine or N-methyl-dipropanolamine, d. ester diols of the general formulae

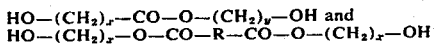

in which
R represents an alkylene or arylene group containing 1 to 10 preferably 2 to 6 carbon atoms,
x = 2–6 and
y = 3–5,
e.g. δ-hydroxybutyl-ε-hydroxy-caproic acid ester; ω-hydroxyhexyl-γ-hydroxybutyric acid ester; adipic acid-(-β-hydroxyethyl) ester and terephthalic acid-bis-(β-hydroxyethyl) ester;

e. diolurethanes of the general formula

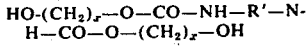

in which
R' represents an alkylene, cycloalkylene or arylene group containing 2 to 15, preferably 2 to 6 carbon atoms and
x represents an integer of between 2 and 6, e.g. 1,6-hexamethylene-bis-(β-hydroxyethylurethane) or 4,4'-diphenylmethane-bis-(δ-hydroxybutylurethane);

f. dioluras of the general formula

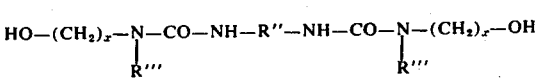

in which
R'' represents an alkylene, cycloalkylene or arylene group containing 2 to 15, preferably 2 to 9 carbon atoms,
R''' represents hydrogen or a methyl group
x = 2–3,
e.g. 4,4'-diphenylmethane-bis-(β-hydroxyethylurea) or the compound

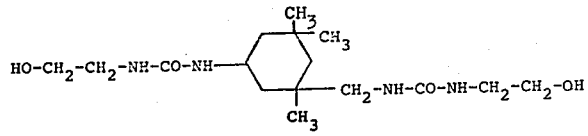

The vinyl copolymers (component B) optionally used according to the invention are prepared by known processes. Suitable monomers for their preparation include e.g. styrene, acrylonitrile, vinyl chloride, vinylidene chloride, vinyl acetate as well as acrylic and methacrylic acid esters of aliphatic alcohols containing 1 to 6 carbon atoms. The copolymer should contain at least two of the vinyl monomers in a quantity of more than 1% by weight, preferably more than 10% by weight.

Copolymers of styrene are preferred for the invention, especially those with acrylonitrile. The styrene content in these copolymers should be between 50 and 99% by weight, preferably between 60 and 80% by weight. The molecular weight of the copolymer is between 50,000 and 500,000 preferably between 70,000 and 100,000.

The diene graft copolymers (component C) used according to the invention are also prepared by known methods.

Suitable polymers used as the graft base are, for example, polybutadiene, polyisoprene, polychloroprene, transpolypentenamers, etc. or mixtures of these compounds. The following are among the vinyl compounds which may be used as monomers for grafting on the polyenes: styrene, acrylonitrile, vinyl acetate and esters of acrylic and/or methacrylic acid. According to the invention, it is preferred to use graft copolymers of the monomers styrene and acrylonitrile grafted on polybutadiene. The polybutadiene content in these compounds should be between 30 and 90% by weight, preferably between 40 and 70% by weight. The proportion of graft monomers in the total graft copolymer should be between 10 and 70% by weight, preferably between 30 and 60% by weight. The proportion of styrene to acrylonitrile is preferably between 2:1 and 4:1. The molecular weight of the graft copolymers is between 50,000 and 500,000 preferably between 70,000 and 100,000.

The polymer mixture used as top coats according to the invention contain 50 to 90% by weight, preferably 70 to 80% by weight of the substantially linear polyurethane (component A), 0 to 50% by weight, preferably 5 to 25% by weight of vinyl copolymar (B) and 1 to 50% by weight, preferably 5 to 25% by weight of dienegraft copolymers (C).

According to the invention the mixtures are used preferably from solutions. These solutions contain 20 to 40% by weight, preferably 25 to 30% by weight of solids in solvent mixtures which contain dimethyl formamide. In addition to dimethylformamide, the solutions preferbly contain methyl ethyl ketone but they may also be mixed with toluene, xylene, ethyl acetate, acetone, methyl isobutyl ketone, methyl glycol acetate, ethyl glycol acetate, cyclohexanone, tetrahydrofuran, etc. The mixtures according to the invention may also be applied to textile substrates by melt extrusion methods or as aqueous dispersions. If the top coats are to be applied as aqueous dispersions, one simply mixes polyurethane dispersions and dispersions of (B) and (C), respectively, in the desired weight ratios. Care has to be taken, however, that only cationic and cationic, anionic and anionic or nonionic and nonionic dispersions, respectively, are mixed with each other in order to prevent coagulation of the latices.

Besides the starting components described above, ionogenic chain extending agents have to be used if ionic polyurethanes are to be produced. The preparation of such self-dispersible aqueous polyurethane dispersions has been described e.g. in British Patent Nos. 791,851; 883,568 and 1,278,426; and in U.S. Pat. Nos. 3,384,606; 3,388,087; 3,479,310; 3,535,274; 3,461,103; 3,178,310 and U.S. Ser. No. 512,194 filed Dec. 7, 1965, now abandoned, and U.S. Ser. No. 586,618 filed Oct. 14, 1966, now abandoned.

In addition to these ionic polyurethane dispersions which are free from emulsifiers, non-ionic self-dispersible polyurethanes may also be used for the process according to the invention. These non-ionic polyurethanes may be obtained e.g. by the process described in Canadian Pat. No. 919,329 or in U.S. Ser. No. 452,163 filed Mar. 18, 1974, now U.S. Pat. No. 3,905,929, and U.S. Ser. No. 452,180 filed Mar. 18, 1974, now U.S. Pat. No. 3,920,598.

It is a characteristic feature of this type of dispersion that it contains polyethylene oxide units which are attached to the polyurethane molecule by way of urethane, urea, biuret or allophanate groups.

Dispersions which have been prepared with the aid of emulsifiers may also be used in the process according to the invention. Products of this kind have been described, for example, in British Patent No. 791,851 and in a report by S. P. Suskind in Journal of Applied Polymer Science, 9 (1965), pages 2451–2458.

Among the ionic dispersions which are free from emulsifiers, it is preferred to use those of anionic polyurethanes which contain sulphonate and/or carboxylate groups or those of cationic polyurethanes which contain quaternary ammonium groups.

Aqueous dispersions of (B) and (C) are prepared by using emulsifiers known per se.

The bonding coats used for laminating the textile substrate with the top coats according to the invention may in principle have the same composition as the top coats but they may in all cases consist of polyurethane A alone. The solvents are also the same. According to the invention, not only one-component polyurethanes but also the two-component system known per se may be used as bonding coat. These are generally mixtures of polyurethane prepolymers which contain hydroxyl end groups and have a molecular weight of about 10,000 to 80,000, preferably 20,000 to 50,000, polyisocyanates and optionally catalysts. In addition to the polyisocyanates mentioned above, the polyisocyanates used may also be compounds which contain more than two isocyanate groups or reaction products of polyhydroxyl compounds with excess polyisocyanate, for example a 75% solution in ethyl acetate of polyisocyanate of trimethylolpropane and 2,4-tolylene diisocyanate having an isocyanate content of about 10% and a solid tolylene diisocyanate content of less than 0.3%.

The bonding coat solutions based on two-component polyurethanes often contain catalysts known per se, e.g. tertiary amines such as triethylamine; tributylamine; N-methylmorpholine; N-ethyl-morpholine; N-cocomorpholine; N,N,N',N'-tetramethyl-ethylenediamine; 1,4-diaza-bicyclo-(2,2,2)-octane, N-methyl-N'-dimethyl-aminoethyl-piperazine; N,N-dimethylbenzylamine; bis-(N,N-diethylaminoethyl)-adipate; N,N-diethylbenzylamine; pentamethyldiethylene-triamine; N,N-dimethylcyclohexylamine; N,N,N',N'-tetramethyl-1,3-butanediamine; N,N-dimethyl-$\beta$-phenylethylamine; 1,2-dimethylimidazole and 2-methylimidazole.

Tertiary amines which contain hydrogen atoms that are reactive with isocyanate groups include e.g. triethanolamine; triisopropanolamine; N-methyl-diethanolamine; N-ethyl-diethanolamine; N,N-dimethyl-ethanolamine and their reaction products with alkylene oxides such as propylene oxide and/or ethylene oxide.

Silaamines with carbon-silicon bonds such as those described e.g. in German Patent Specification No.

1,299,290, may also be used at catalysts, e.g. 2,2,4-trimethyl-2-silamorpholine and 1,3-diethylaminomethyl-tetramethyl-disiloxane.

Organic metal compounds may also be used as catalysts according to the invention, particularly organic titanium compounds.

Other representatives of catalysts which may be used according to the invention and details concerning the activity of the catalysts are described in Kunststoff-Handbuck, Volume VII, published by Vieweg and Hochtlen, Carl-Hanser-Verlag, Munich 1966, e.g. on pages 96 to 102.

The solvents used for the bonding coats may be any of those already mentioned for the top coats. Highly polar solvents such as dimethylformamide, however, should only be present in quantities of less than 70% by weight, preferably less than 50% based on the total solvent mixture.

Pigments, fillers and other auxiliary agents such as stabilizers to resist hydrolysis, UV stabilizers, age resistors, polysiloxanes, cross-linking agents and accelerators may, of course, also be added to the top coat solutions consisting of the mixtures used according to the invention and to the bonding coat solutions.

Coating a textile by the reversal process is generally carried out as follows: In a coating machine, a top coat solution is applied to a release substrate such as release paper, a steel plate, siliconized textile etc., e.g. by means of a doctor roll. After the first passage through the drying channel which has an air temperature of about 80° to 100°C at the inlet and about 120° to 140°C at the outlet, the bonding coat solution is applied in a similar manner either in a second coating apparatus or after return of the web, the textile web is then applied and the solvent mixture in the bonding coat is evaporated off in a drying channel. On leaving the drying channel, the release substrate and coated web of fabric are rolled up independently of each other.

The coated textiles resulting from the invention are woven or knitted fabrics or even bonded webs which may be used in the manufacture, for example, of raincoats, textiles for upholstered chairs, hand bags, shoes, such as, athletic shoes, and ground sheets for camping equipment.

The textiles to be coated according to the invention may be made of fibres of any chemical composition, such as cotton, rayon, polyester, polyamide, etc.

The examples illustrate the increased light fastness and light resistance of the coating mixtures according to the invention of polyurethanes, vinyl copolymers and diene graft copolymers. The figures represent parts by weight or percentages by weight unless otherwise indicated.

EXAMPLE OF METHOD

General method of coating

In a coating machine, top coat solution D is applied to a commercially available siliconized release paper by means of a doctor roll; the quantity applied is 120 g/m$^2$. After a first passage through a drying channel which has an air temperature of 100°C at the inlet and 140°C at the outlet, the bonding coat solution H (120 g of solution per m$^2$) is applied in a similar manner in a second coating installation, the textile web, a napped cotton duvetyn weighing 240 g per square meter, is applied and the solvent mixture of the bonding coat is evaporated off in the drying channel. On leaving the drying channel, the release paper and coated fabric web are rolled up independently of each other.

EXAMPLE 1

Top coat solution D1 is a 30% synthetic resin solution in dimethylformamide/methyl ethyl ketone (3:2) with a viscosity of 12,000 cP at 25°C it contains:
24.0% of a polyurethane elastomer substantially free of reactive end groups from 2,250 g (1.0 mol) of a polyester of butane-1,4-diol and adipic acid having a molecular weight of about 2250, 216.0 g of butane-1,4-diol (2.4 mol) and the equivalent quantity of 4,4'-diphenylmethane-diisocyanate (850 g);
4.20% of a copolymer of styrene and acrylonitrile in proportions of 72:28 having a molecular weight of about 100,000;
1.80% of a butadiene graft copolymer of 50% polybutadiene, 36% of styrene and 14% of acrylonitrile (molecular weight about 100,000);
42% dimethylformamide and
28% of methyl ethyl ketone. Top Coat solution D 2 is a 30% synthetic resin solution in dimethylformamide/methyl ethyl ketone (3:2) with a viscosity of 20,000 cP at 25°C; it contains:
21.0% of the polyester urethane used in top coat solution D 1;
3.15% of the copolymer of styrene and acrylonitrile used in top coat solution D 1;
5.85% of the butadiene graft copolymer described for top coat solution D 1;
42% of dimethylformamide and
28% of methyl ethyl ketone.
Top Coat Solution D 3 (Comparison experiment) is a 30% synthetic resin solution in dimethylformamide/methyl ethyl ketone (3:2) with a viscosity of 20,000 cP at 25°C; it contains:
30% of the polyesterurethane of top coat solution D 1,
42% of dimethylformamide and
28% of methyl ethyl ketone.

Bonding coat solution H 1 is a 25% solution of a polyester urethane substantially free of reactive end groups is dimethylformamide/methyl ethyl ketone (3:7) with a viscosity of 7,000 cP at 25°C which has been obtained from 1,700 g (1.0 mol) of a copolyester of hexane-1,6-diol, neopentylglycol and adipic acid, said copolyester having a molecular weight of about 1,700, said diols being present in equal amounts to supply the same equivalents of hydroxyl groups, 135.0 g of butane-1,4-diol (1.5 mol) and the equivalent quantity of 4,4-diphenylmethane diisocyanate (625 g).

|  | D 1 | D 2 | D 3 (comparison) |
|---|---|---|---|
| Lightfastness (determined according to DIN 54 004) | 5 | 5 | 4 |
| Tensile strength (kp/cm$^2$) |  |  |  |
| a) zero value | 500 | 500 | 500 |
| b) after 400 hours Xeno test (DIN 54 004) | 300 | 260 | 80 |

The lightfastness and, particularly, the light resistance of the films of top coat solutions D 1 and D 2 are considerably better than those of films obtained from the top coat solution D 3 which contains no vinyl copolymer and no diene graft copolymer.

EXAMPLE 2

Top coat solution D 4 is a 30% synthetic resin solution in dimethylformamide/methyl ethyl ketone (1:1) with a viscosity of 14,000 cP at 25°C; it contains:
- 21.0% of a polyester urethane of 2000 g (1.0 mol) of a copolyester of ethylene glycol/butane-1,4-diol and adipic acid (molecular weight about 2000), 108.0 g (1.20 mol) of butane-1,4-diol, 141.6 g (1.20 mol) of hexane-1,6-diol and an equivalent quantity of 4,4'-diphenylmethane diisocyanate (850 g);
- 3.15% of the copolymer of styrene and acrylonitrile contained in top coat solution D 1;
- 5.85% of the butadiene graft copolymer containing top coat solution D 1; 35% of dimethylformamide and
- 35% of methyl ethyl ketone, Top coat solution D 5 (comparison product) is a 30% synthetic resin solution in dimethylformamide/methyl ethyl ketone (1:1) with a viscosity of 17,000 cP at 25°C. It contains:
- 30% of the polyester urethane described for top coat solution D 4;
- 35% of dimethylformamide and
- 35% of methyl ethyl keton.

|  | D4 | D 5 (comparison) |
|---|---|---|
| Lightfastness (determined according to DIN 54 004) | 5 | 4 |
| Tensile strength (kp/cm²) | | |
| a) zero value lightfastness | 380 | 390 |
| b) 400 hours Xeno test (DIN 54 004) | 270 | 60 |

What is claimed is:

1. A process for producing coated textile sheets which comprises:
   A. applying to a release substrate an organic solvent solution or aqueous dispersion top coat of polymers comprising
      i. 50 to 90% by weight, based on the total polymer, of a substantially linear polyurethane which is substantially free of reactive end groups and which has been prepared by a process which comprises reacting an organic dihydroxyl compound of molecular weight 500 to 4000 and an organic diol of molecular weight 62 to 450 with an aromatic diisocyanate,
      ii. 5 to 25% by weight of a vinyl copolymer, and
      iii. 1 to 50% by weight of a diene graft copolymer,
   B. evaporating sufficient solvent to leave a substantially dried top coat on said substrate
   C. applying a bonding coat solution to said top coat
   D. applying said textile sheet to be coated to said release substrate whereby said top coat and said bonding coat are therebetween
   E. substantially evaporating the solvent from said bonding coat, and
   F. separating the resulting coated textile from said release substrate.

2. The process of claim 1 wherein said bonding coat is an inert organic solvent solution of a substantially linear polyurethane which is substantially free of reactive end groups and which has been prepared by a process which comprises reacting a dihydroxyl compound having a molecular weight of about 500 to about 4000 and a diol having a molecular weight of about 62 to about 450 with an aromatic diisocyanate.

3. The process of claim 1 wherein said top coat is composed of
   i. 70 to 80% by weight of said polyurethane,
   ii. 5 to 25% by weight of vinyl copolymer and
   iii. 5 to 25% by weight of diene graft copolymer.

4. The process of claim 1 wherein said vinyl copolymer is a copolymer of 50 to 99% by weight of styrene and 1 to 50% by weight of acrylonitrile.

5. The process of claim 1 wherein said vinyl copolymer is a copolymer of 60 to 80% by weight of styrene and 20 to 40% by weight of acrylonitrile.

6. The process of claim 1 wherein said diene graft copolymer is based on butadiene in an amount of 30 to 90% by weight.

7. The process of claim 1 wherein said diene graft copolymer is based on butadiene in an amount of 40 to 70% by weight.

8. The process of claim 1 wherein said diene graft copolymer is based on 40 to 70% by weight butadiene graft copolymerized with 30 to 60% by weight of styrene/acrylonitrile in proportions by weight of between 2:1 and 4:1.

9. The process of claim 1 wherein said release substrate is paper.

10. The product of the process of claim 1.

* * * * *